Patented Aug. 15, 1933

1,922,160

UNITED STATES PATENT OFFICE 1,922,160

PROCESS AT THE SULPHITE CELLULOSE DIGESTION, OF REMOVING TURPENTINE AND OTHER VOLATILE MATTERS PRESENT IN THE CHIPS

Gustaf Haglund, Stockholm, Sweden, assignor to Patentaktiebolaget Grondal - Ramen, Stockholm, Sweden No Drawing. Application March 25, 1932, Serial No. 601,300, and in Sweden April 15, 1931

8 Claims. (Cl. 92—2)

This invention relates to the production of sulphite cellulose, and more particularly to a process for producing an improved sulphite cellulose product.

Sulphite cellulose as heretofore obtained from the digesters, presents an objectionable characteristic of tending to adhere to parts of the machines which are employed in its subsequent handling. This objectionable adhesive property appears to result principally from the presence in the cellulose of residual resins which are in a gluey and, at room temperature, semi-liquid form which promotes the formation of dark, sticky masses which adhere to the machine parts.

It is an object of the present invention to provide an improved sulphite cellulose product in which the resins are present in a form which does not present the objectionable sticky characteristics noted, and this I have found can be accomplished by eliminating from the cellulose, turpentine, oils, and similar volatile materials, which appear to be principally responsible for the sticky characteristic which is imparted to the resins. The elimination of such materials leaves the resin in the cellulose in a much purer form, which does not exhibit the former sticking difficulties in machine handling as in the case of the sulphite previously produced. Moreover, the resin which remains in the cellulose is much like the resin which is usually added afterwards to the cellulose for the production of paper, and may accordingly be utilized as a substitute either in whole or in part for this otherwise necessary resin addition.

By way of illustration, I will describe a method of carrying out the process of the present invention in accordance with the sulphite cellulose process disclosed in my copending application Serial No. 529,299, filed April 10, 1931, in conjunction with which the present process results in even further advantages. In the process of that application the crude cellulosic material is digested with two different cooking liquors, the first of which consists of a solution of alkali bisulphite, sulphite, or a mixture of both, and the second of a solution which provides what may be called free sulphur dioxide, in that sulphur dioxide is contained therein in excess of that necessary to combine with the base as bisulphite. In that process the cellulosic material, for example wood chips, is first saturated and cooked with the first mentioned liquor for a suitable period, and thereafter the free sulphur dioxide liquor is introduced under pressure and the cellulose cooked with the additive liquors.

In applying the present invention to the sulphite process of that application, the first cooking liquor, for example a solution of sodium bisulphite in water, or if desired, in waste liquor from a previous digestion, is introduced into a digester filled with wood chips or any other suitable cellulosic material, and is caused to suitably penetrate into the chips. This may be accomplished by simple soaking or by the use of forced circulation. In the latter event the liquor is continually pumped off at the lower portion of the digester and reintroduced at the top in the form of a spray.

After the chips have been suitably penetrated by the first liquor the temperature is ultimately raised to a suitable degree, for example to 110–150° C., to cause sulphonation of the incrusted materials (lignine, etc.). If desired, the elevation of the temperature may be accomplished simultaneously with the penetration of the liquor, where forced circulation is used, by providing means externally of the digester, for example steam coils, over which the liquor being extracted from the digester may be passed before being pumped back at the top of the digester. When the temperature has been increased to a suitable degree, for example 110–150° C., the turpentine, oils, and similar volatile materials are driven out of the chips and mix with the steam present in the digester. These volatile materials can be driven off from the wood more or less completely or to the extent desired, depending upon the degree to which the temperature is elevated in the process and the length of time devoted to driving off the volatile matter.

In the process of my copending application, after this first digestion step has been carried to a suitable degree the solution containing the free sulphur dioxide used for the second digestion step is then pumped into the digester under pressure, the materials previously present therein being retained.

In the process of the present invention, however, the mixture of steam, turpentine, oils, and other vapors and gases, formed in the first cooking, is blown out from the digster prior to the addition of the free sulphur dioxide solution for the second cooking. In this manner the turpentine and other solvents or dispersing mediums for the resin which impart the objection hereinbefore noted, are eliminated and the residual resins in the final product are in a much more desirable form.

Furthermore, by conducting the removal of these vapors and gases at this point in the operation, little sulphur dioxide loss is involved inasmuch as the first cooking liquor contained only salts of sulphurous acid and did not contain the free sulphur dioxide solution. Consequently little or no free sulphur dioxide will be lost when the turpentine and like vapors are blown off.

The vapors blown off from the digester are condensed and the turpentine, oils, and other materials separated in any suitable manner.

After this removal of the volatile materials the solution of free sulphur dioxide, either in water or in waste liquor, is then added to the digester. Inasmuch as the temperature in the digester will still be at a fairly elevated point, despite the removal of the vapors aforenoted, it is preferable that the free sulphur dioxide solution be introduced under pressure, for example by means of a pump, in order to minimize loss of sulphur dioxide gas during the introduction. After a suitable amount of the free sulphur dioxide solution has been introduced into the digester, the forced circulation system and the external heating devices are again brought into operation and the temperature in the digester is gradually elevated and maintained at the point required for completing the digestion of the sulphonated pulp resulting from the previous action of the sulphurous acid salt.

While in the specific illustration aforenoted it has been indicated by way of example that the first cooking liquor is constituted of a solution of sodium bisulphite, other sulphurous acid salts may be used in lieu thereof. The sulphurous acid salts which may be used for the first cooking liquor comprise alkali metal sulphites, bisulphites and mixtures of the same, likewise alkaline earth bisulphites, and also sulphurous acid salts of ammonia. It is preferable however, to utilize salts of the alkali metals because of solubility factors, with the practical and economical advantage thereby presented in the matter of providing concentrated solutions for the process.

The application of the process of the present invention to a process such as that of my copending application, wherein the digestion is conducted with the two cooking liquors, viz. the sulphurous acid salt solution and the free sulphur dioxide solution, as herein described, presents additional advantages over that proceeding from the removal of the resin solvents as noted. The cooking liquor in such modified process, for example, remains lighter in color and more stable, facilitating the avoidance of "black digestion" or burning in the operation. This circumstance is particularly to be noticed when sulphite instead of bisulphite solutions are used as the first cooking liquor. Furthermore, the modified process appears to counteract the tendency of the cellulose to secure a reddish color. This favorable action appears to be in large part ascribable to the aforenoted removal of the volatile materials from wood, for when using bisulphite solutions in the first liquor for example, and removing the volatile materials as noted, some of the volatile materials when collected in the condensate assume a strong red color when exposed to air. There is conseqeuntly ground for the supposition that in the usual cooking processes some of the volatile materials are the active factors which are involved in the red coloration of the cellulose.

While in the foregoing I have specifically described the removal of the turpentine, oils, and similar volatile resin solvents from the wood, intermediate the treatment of the cellulosic material with the two sulphiting solutions of the particular process of my copending application hereinbefore identified, the present invention is not limited thereto but may be utilized in other manners. The removal of the turpentine, etc., may for example be conducted at other times prior to the completion of the digestion, depending upon the particular process involved, its occurrence intermediate the steps of the specific process noted being dictated to a material extent by the desire to avoid the loss of free sulphur dioxide which would otherwise be occasioned. Moreover, the volatile materials may also be removed from the crude cellulose material before it is subjected to the sulphiting proper. This may be accomplished for example by utilizing water or other liquid or solution that is neutral to the crude cellulose material and which will aid (the water as steam for example) in distilling off the volatile organic matter. In such cases however, the distillation of the volatile materials is all that is effected and there is no simultaneous sulphonation of the incrusted materials of the wood.

I claim:

1. The sulphite cellulose digestion process which comprises, cooking the cellulose-containing material in a digester with a solution of a sulphurous acid salt, providing a suitably elevated temperature in said cooking whereby turpentine, oils, and other volatile organic materials are vaporized, withdrawing said vapors from the digester, adding a solution of sulphur dioxide to the digester, and cooking the cellulose-containing material with the resulting additive solutions.

2. The sulphite cellulose digestion process which comprises, cooking the cellulose-containing material in a digester with an aqueous solution of a salt of the group: alkali metal sulphite, alkali metal bisulphite, alkaline earth bisulphite, providing a suitably elevated temperature in said cooking whereby turpentine, oils, and other volatile organic materials are vaporized, withdrawing said vapors from the digester, adding a solution of sulphur dioxide to the digester, and cooking the cellulose-containing material with the resulting additive solutions.

3. The sulphite cellulose digestion process which comprises, cooking the cellulose-containing material in a digester with a solution of a sulphurous acid salt, elevating the temperature in said cooking to approximately 110–150° C. whereby turpentine, oils, and other volatile organic materials are vaporized, withdrawing said vapors from the digester, adding a solution of sulphur dioxide to the digester, and cooking the cellulose-containing material with the resulting additive solutions.

4. The sulphite cellulose digestion process which comprises, cooking the cellulose-containing material in a digester with an aqueous solution of a salt of the group: alkali metal sulphite, alkali metal bisulphite, alkaline earth bisulphite, elevating the temperature in said cooking to approximately 110–150° C. whereby turpentine, oils, and other volatile organic matter are vaporized, withdrawing said vapors from the digester, adding a solution of sulphur dioxide to the digester, and cooking the cellulose-containing material with the resulting additive solutions.

5. The sulphite cellulose digestion process which comprises, subjecting the cellulose-containing material to an incomplete sulphite digestion in a digester with elevation of the temperature in the digester to a point at which turpentine, oils, and other volatile organic matter in the material are vaporized, withdrawing said vapors from the digester, and then completing the sulphite digestion.

6. In the digestion of sulphite cellulose, the steps which consist in vaporizing the turpentine, oils, and other volatile organic matter in the cellulose-containing material, segregating said vapors from said material, and subjecting the residual cellulose-containing material to a sulphite digestion process.

7. In the digestion of sulphite cellulose, the steps which consist in distilling with steam the turpentine, oils, and other volatile organic matter in the cellulose-containing material, separating the aqueous and admixed vapors from said material, and subjecting the cellulose-containing material to a sulphite cellulose digestion.

8. In the digestion of sulphite cellulose, the steps which consist in providing a temperature in the digester suitably elevated to vaporize the turpentine, oils, and other volatile organic matter in the cellulose-containing material being digested before the turpentine has been chemically altered to any substantial extent, and separating said vapors from the cellulose-containing material and the accompanying cooking liquor while said vapors are at a temperature above that at which they will condense.

GUSTAF HAGLUND.